(12) United States Patent
Belk et al.

(10) Patent No.: US 7,106,758 B2
(45) Date of Patent: *Sep. 12, 2006

(54) CIRCUIT AND METHOD FOR SERVICE CLOCK RECOVERY

(75) Inventors: Jonathan R. Belk, Richardson, TX (US); Richard A. Nichols, Richardson, TX (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 885 days.

This patent is subject to a terminal disclaimer.

(21) Appl. No.: 09/921,945

(22) Filed: Aug. 3, 2001
(Under 37 CFR 1.47)

(65) Prior Publication Data

US 2003/0063625 A1 Apr. 3, 2003

(51) Int. Cl.
*H04J 3/06* (2006.01)
*H04L 12/28* (2006.01)
*H04L 12/56* (2006.01)
*H04J 1/16* (2006.01)
*H04J 3/14* (2006.01)

(52) U.S. Cl. ............... 370/503; 370/395.62; 370/516; 370/518; 375/354

(58) Field of Classification Search ............ 370/396.2, 370/516, 518, 503, 474, 507, 252, 253, 509; 375/371, 372, 373, 376, 354, 365, 352
See application file for complete search history.

(56) References Cited

U.S. PATENT DOCUMENTS

| 4,961,188 | A | * | 10/1990 | Lau | 370/517 |
|---|---|---|---|---|---|
| 5,007,070 | A | * | 4/1991 | Chao et al. | 375/371 |
| 5,204,882 | A | * | 4/1993 | Chao et al. | 375/354 |
| 5,260,978 | A | * | 11/1993 | Fleischer et al. | 375/354 |
| 5,274,680 | A | * | 12/1993 | Sorton et al. | 375/371 |
| 5,396,492 | A | * | 3/1995 | Lien | 370/412 |
| 5,526,362 | A | * | 6/1996 | Thompson et al. | 370/516 |
| 5,608,731 | A | * | 3/1997 | Upp et al. | 370/395.62 |
| 5,778,218 | A | * | 7/1998 | Gulick | 713/503 |
| 5,844,891 | A | * | 12/1998 | Cox | 370/395.62 |
| 5,896,427 | A | * | 4/1999 | Muntz et al. | 375/372 |
| 6,011,823 | A | * | 1/2000 | Bleiweiss et al. | 370/395.62 |
| 6,111,878 | A | * | 8/2000 | Powell | 370/395.62 |
| 6,157,646 | A | * | 12/2000 | Nichols | 370/395.62 |
| 6,167,048 | A | * | 12/2000 | Law et al. | 370/395.62 |
| 6,363,073 | B1 | * | 3/2002 | Nichols | 370/395.62 |

(Continued)

FOREIGN PATENT DOCUMENTS

EP 0 622 918 A2 11/1994

(Continued)

OTHER PUBLICATIONS

"Circuit Emulation Service Interoperability Specification Version 2.0", *af-vtoa*-0078.000. The ATM Forum Technical Committee, i-93 (Jan. 1997).

(Continued)

*Primary Examiner*—Chirag Shah
(74) *Attorney, Agent, or Firm*—Fogg and Associates LLC; David N. Fogg

(57) ABSTRACT

A method for synchronizing a service clock at a destination node with a service clock at a source node is provided. The method includes receiving data packets from a source node at at least one port of the destination node. At the destination node, the method determines control values for a numerically controlled oscillator for a plurality of time periods. The method selectively uses the control values to set the frequency of a service clock at the destination node for use in receiving data packets.

54 Claims, 3 Drawing Sheets

U.S. PATENT DOCUMENTS 6,400,683 B1 * 6/2002 Jay et al. .................... 370/229
6,721,328 B1 * 4/2004 Nichols et al. ........ 370/395.62

FOREIGN PATENT DOCUMENTS

| EP | 622918 A2 | * | 11/1994 |
|---|---|---|---|
| EP | 0 705 000 A2 | | 4/1996 |
| EP | 705000 A2 | * | 4/1996 |
| EP | 0 800 326 A2 | | 10/1997 |
| EP | 800326 A2 | * | 10/1997 |
| EP | 0 876 016 A1 | | 11/1998 |
| EP | 876016 A1 | * | 11/1998 |
| EP | 0 915 587 A2 | | 5/1999 |
| EP | 915587 A2 | * | 5/1999 |
| FR | 2746230 A1 | * | 9/1997 |
| JP | 09036846 A | | 2/1997 |
| JP | 09214477 A | | 8/1997 |
| JP | 2746230 | | 9/1997 |
| WO | WO 95/33320 | * | 12/1995 |

OTHER PUBLICATIONS

Lau et al., "Synchronous Techniques for Timing Recovery in BISDN", *IEEE* Transactions on Communications, 1810-1818 (Mar./Apr. 1995).

Mulvey et al., "Jitter/wander analysis of adaptive clock recovery for constant bit rate services over ATM". *BT Technology Journal*, vol. 13, 46-51 (Jul. 1995).

Mulvey et al., "Timing issues of constant bit rate services over ATM", *BT Technology Journal*, vol. 13, 35-45 (Jul. 1995).

* cited by examiner

CIRCUIT AND METHOD FOR SERVICE CLOCK RECOVERY

CROSS REFERENCE TO RELATED CASES

This application is related to commonly-assigned U.S. Pat. No. 6,157,646, entitled "CIRCUIT AND METHOD FOR SERVICE CLOCK RECOVERY," and issued Dec. 5, 2000 (the '646 Patent.) The '646 Patent is incorporated herein by reference.

This application is also related to commonly-assigned, co-pending U.S. application Ser. No. 09/443,662, entitled "ADAPTIVE CLOCK RECOVERY FOR CIRCUIT EMULATION SERVICE" (the '662 Application) filed on Nov. 19, 1999 (pending).

TECHNICAL FIELD OF THE INVENTION

The present invention relates generally to the field of telecommunications and, in particular, to a circuit and method for service clock recovery.

BACKGROUND OF THE INVENTION

Asynchronous Transfer Mode (ATM) is a packet oriented technology which permits continuous bit rate signals carrying one or more of voice, video, and data, to be conveyed across a broadband network within packets. ATM is suitable for the transport of bursty traffic such as data, as well as accommodating constant or continuous bit rate signals. In delivering continuous bit rate traffic (e.g., T1, DS3 signals) in a broadband network, a service clock controlling a destination node buffer must operate at a frequency precisely matched to that of a service clock at a source node in order to avoid buffer overflow or underflow and resulting loss of data.

One problem with synchronizing the service clock at the destination node with the service clock at the source node is "cell jitter" that is inherent in the use of an ATM network. Cell jitter is the random delay and aperiodic arrival of cells at a destination node. In other words, cell jitter means that all of the cells or packets that travel between a source node and a destination node do not take the same amount of time to travel through the ATM network. Thus, it is difficult to use the cell arrival times to directly synchronize the frequency of the service clock at the destination node with the service clock at the source node.

Numerous schemes have been proposed to provide a mechanism for synchronizing the service clocks of source and destination nodes in the presence of cell jitter. This is also referred to as "service clock recovery." Descriptions of many of these schemes are provided in Fleischer et al. U.S. Pat. No. 5,260,978 (the '978 Patent). The '978 Patent incorporated by reference. Perhaps the most elegant and widely accepted of the service clock recovery schemes is known as synchronous residual time stamp (SRTS or RTS) encoding. SRTS encoding is specified, for example, in T1.630, Annex A for delivering T1 service over an ATM network.

The '978 Patent describes one embodiment of SRTS encoding. A free running four bit counter is used at the source node to count cycles of a common network clock. At the end of every residual time stamp (RTS) time period formed by 3008 service clock cycles (i.e., eight cells of forty-seven bytes of data each), the current four bit count of the four bit counter is transmitted in the ATM adaptation layer (AAL1) by using one bit in every other byte of the AAL1 for eight cells. It should be noted that the AAL1 is the overhead byte which accompanies the forty-seven bytes of data to constitute the forty-eight-byte payload of an ATM cell. The ATM cell also includes five additional bytes of header. The four-bit SRTS provides sufficient information for unambiguously representing the number of network clock cycles within a predetermined range.

The clock recovery at the destination node according to the '978 Patent involves determining from the received RTSs the number of network clock cycles in each RTS period, and generating a pulse signal from the network clock in which the periods are determined by the number of network clocks represented by the received RTSs. The pulse frequency is then multiplied by 3008 in order to recover the source node service clock.

While the clock recovery mechanism of the '978 Patent might be suitable for recovering the source node service clock, it is neither the only recovery mechanism possible, nor necessarily the most optimal mechanism for recovering the source node service clock.

U.S. Pat. No. 5,608,731, entitled *Closed Loop Clock Recovery for Synchronous Residual Time Stamp* (the '731 Patent) describes another service clock recovery technique using SRTS. The '731 Patent describes an apparatus with a digitally controlled oscillator at the destination node. A local RTS-related value is generated at the destination node based on the output of the digitally controlled oscillator. RTS values from incoming data packets are compared to the local RTS-related values generated at the destination node. This provides a feedback error or control signal. The control signal is used to adjust the digitally controlled oscillator at the destination node. With the feedback loop as provided, when the destination node clock is faster than the source clock, the error signal will cause the destination node clock to slow, and vice versa. Unfortunately, the complex circuitry used in this closed loop must be replicated for each port at the destination node. Further, this closed loop solution suffers from problems common to closed loop control circuits.

For the reasons stated above, and for other reasons stated below which will become apparent to those skilled in the art upon reading and understanding the present specification, there is a need in the art for an improved circuit and method for service clock recovery.

SUMMARY OF THE INVENTION

The above mentioned problems with service clock recovery in a telecommunications network using asynchronous transfer mode and other problems are addressed by the present invention and will be understood by reading and studying the following specification. Service clock recovery is described using a direct digital synthesis (DDS) circuit that is set based on control values calculated over a plurality of time periods. This technique is applicable to a variety of clock recovery mechanisms including but not limited to mechanisms using Residual Time Stamp (RTS) values and adaptive clock recovery using buffer fill levels at the destination node.

In particular, one embodiment of the present invention provides a method for synchronizing a service clock at a destination node with a service clock at a source node for circuit emulation service over a packet network. The method includes receiving data packets from a source node at least one port of the destination node. At the destination node, the method removes from the data packets residual time stamp (RTS) values that were created at the source node based on at least the service clock at the source node. The method further determines a majority count and a minority count of RTS values over a plurality of time periods. The method uses the majority and minority counts for the plurality of time periods to set the frequency of a service clock at the destination node for use in receiving data packets.

DETAILED DESCRIPTION OF THE INVENTION

In the following detailed description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

I. Overview

Embodiments of the present invention provide improvements in techniques for recovering a service clock at a destination node. A first embodiment, described in section I below, relates to recovery of a service clock using residual time stamp (RTS) values. The second embodiment describes a system that uses an adaptive clock recovery technique to recover the service clock. A common theme in both embodiments is that the service clock is controlled based on values calculated over a plurality of time periods.

II. Service Clock Recovery with Synchronous Residual Time Stamp

Figure 1:
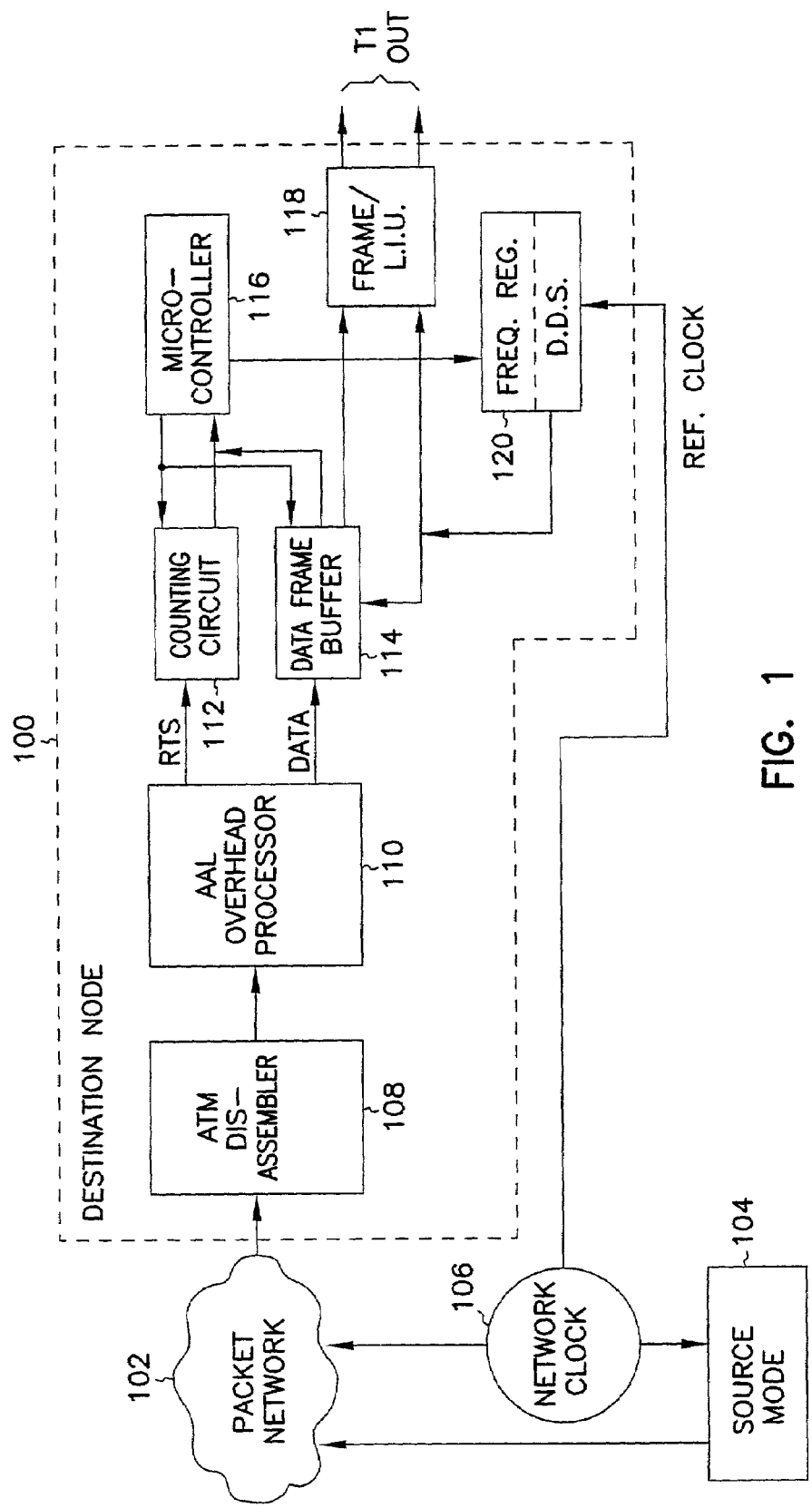
FIG. 1 is a block diagram of an embodiment of a service clock recovery circuit constructed according to the teachings of the present invention.

FIG. 1 is a block diagram of an embodiment of a circuit for recovering a service clock at destination node 100 according to the teachings of the present invention. Destination node 100 receives data packets from source node 104 over packet network 102. Source node 104 includes a service clock that is used to clock data packets for circuit emulation service over network 102. In order to properly process the packets received at destination node 100, destination node 100 needs to "recover" the service clock of source node 104. In other words, destination node 100 needs to locally generate a service clock that is substantially synchronized with the service clock of source node 104 to provide acceptable circuit emulation service.

For simplicity in describing the techniques for service clock recovery, destination node 100 and source node 104 are generally described in the context of a single channel with transmission in a single direction. However, it is understood that both destination node 100 and source node 104 are bi-directional, multi-channel nodes. Thus, in one embodiment, each node of the network includes circuitry of the type described below that is used to synchronize a local service clock for each channel with a service clock at a remote node.

Source node 104 incorporates a signal into the data packets sent to destination node 100 that is used to recover the service clock at destination node 100. For example, source node 104 incorporates "residual time stamp" (RTS) values into the ATM Adaptation Layer of the data packets it transmits as described above. One embodiment of this technique is described in U.S. Pat. No. 5,608,731 entitled *Closed Loop Clock Recovery for Synchronous Residual Time Stamp* (the '731 Patent). The portion of the '731 Patent that describes the generation of RTS values (including FIG. 1 and Col. 2, line 65 to Col. 3, line 36 of the '731 Patent), is incorporated by reference.

Destination node 100 includes circuitry that is used to remove and process the RTS values to generate a local service clock signal that is synchronized with the service clock at source node 104. ATM disassembler 108 is coupled to receive packets from packet network 102. ATM disassembler 108 disassembles the packets and passes the disassemble packets on to AAL overhead processor 110. AAL overhead processor 110 extracts RTS values and passes the RTS values to counting circuit 112. Further, AAL overhead processor 110 also passes data from the packets to buffer 114. Buffer 114 and counting circuit 112 are both coupled to microcontroller 116.

In one embodiment, microcontroller 116 uses information from counting circuit 112 to control direct digital synthesis circuit (DDS) 120 to generate a local service clock signal for destination node 100. In another embodiment, microcontroller 116 also uses a fill level of buffer 114 to control the frequency of the local service clock generated by DDS circuit 120.

Direct digital synthesis circuit 120 comprises a circuit that synthesizes an output sine wave at a frequency that is a fraction of a reference clock or oscillator, e.g., network clock 106. In one embodiment, network clock 106 is the OC-3 byte clock of a packet network. Typically, the output sine wave of direct digital synthesis circuit 120 has a frequency that is less than one-third of the frequency of the reference clock. Conventionally, the fraction used by a direct digital synthesis circuit is established using a large digital number, e.g., a 32 bit number. This results in a very high resolution on the frequency of the output sine wave. In other words, a direct digital synthesis circuit provides precise control over the frequency of its output signal. It is noted that the frequency stability of a direct digital synthesis circuit is the same as its reference clock. Thus, temperature and aging do not affect its output frequency as would happen with a digitally controlled oscillator of the '731 Patent.

For a direct digital synthesis circuit using an OC-3 byte clock and a 32 bit register, the output clock signal can be set to have a frequency within a tolerance of 5 parts per billion (PPB). The required frequency range for the service clock is ±200 parts per million (PPM), and for T1 the typical four bit residual time stamp (RTS) count ranges from 13 to 15. The direct digital synthesis circuit is thus capable of a higher level of precision than the residual time count. Therefore, to more precisely control the service clock frequency, destination node 100 looks at a number of samples of RTS values over a plurality of time windows to determine "interpolated" count values. The interpolated count values are used to calculate a value to write to the register of direct digital synthesis circuit 120 so as to produce a desired, more accurate frequency for the local service clock.

Direct digital synthesis circuit 120 provides this local service clock signal to buffer 114 and frame/line interface unit (frame/LIU) 118. Frame/LIU 118 provides an output signal such as a T1 output. The clock signal from direct digital synthesis circuit 120 controls the rate at which data is processed by buffer 114 and frame/LIU 118. Thus, if the frequency of the signal from direct digital synthesis circuit 120 is too low, the level of data in buffer 114 will increase and, if direct digital synthesis circuit 120 is not adjusted, buffer 114 could overflow and data could be lost. Thus, microcontroller 116 uses both RTS values and buffer fill data to control direct digital synthesis circuit 120.

Microcontroller 116 is programmed to generate a number that sets the frequency of direct digital synthesis circuit 120 based on RTS values processed by counting circuit 112 over a plurality of time periods. In another embodiment, microcontroller 116 uses an indication of the fill level of buffer 114 to further adjust the frequency of direct digital synthesis circuit 120. Advantageously, the use of microcontroller 116 to control direct digital synthesis circuit 120 based on received RTS values and buffer fill levels avoids the complexity of a closed, feedback loop which would need to be replicated for each port of the node. The techniques relating to RTS values and buffer fill levels are described in turn below.

Microcontroller 116 executes a process that effectively interpolates RTS values over a plurality of time periods to derive a number that is used to set the output of direct digital synthesis circuit 120. The following derivation is provided to assist in understanding the relationship between the RTS values monitored in a given time period and the number that is writable to the register, FREQ. REG., of direct digital synthesis circuit 120. First, RTS values are generated at source node 104 by running a counter with the network clock. This means that the value in the counter is incremented by 1 every cycle of the network clock. The value in the counter is "latched" or read out of the counter each time the service clock counter at the source node completes a count of Q, e.g., 3008 for T1 and E1 service. This physical relationship can be represented mathematically as shown in Equation 1:

$$\text{TOTAL COUNT} = f_{NET} \cdot T_S \cdot Q = f_{NET} \cdot \frac{Q}{f_S}$$

In Equation 1, the term $f_{NET}$ refers to the frequency of the network clock, e.g., $2.43 \times 10^6$ for T1 and E1 service. $T_S$ is the period of the service clock which is multiplied by a factor, Q. The period of Q service clocks represents the amount of time over which the counter is incremented and the frequency of the network clock represents the number of times per second that the counter is incremented. Thus, the product of these two quantities, $f_{NET}$ and $T_S \cdot Q$, gives the value in the counter.

One underlying assumption in Equation 1 is that the counter has a sufficient number of bits to count the cycles of the network clock during the modified service clock period. However, a 4-bit counter is specified for RTS generation. Thus, when the counter reaches its highest value, i.e., 15 for a 4 bit counter, it wraps back around to zero and starts over again. At the end of Q periods of the service clock, there is a value stored in the counter. This value is the RTS value that is transmitted to destination node 100.

The counter used to generate RTS values is not reset when an RTS value is read out of the counter. For the next RTS value, there is a residual, usually non-zero, value in the counter. Thus, consecutive RTS values typically are not the same. However, for simplicity in the derivation, RTS values will be considered to be 16 minus the difference between consecutive readings of the counter, taking into consideration that the counter wraps back around to zero when it reaches 15 (e.g., the two's complement of the difference between the RTS values). For example, consecutive counter values of 14, 12, 10, 8, and 6 will be treated as five consecutive RTS values of 14.

Equation 1 can be modified to account for the wrapping nature of a P-bit counter as shown in Equation 2.

$$RTS = \left( \frac{f_{NET} \cdot \frac{Q}{f_S}}{2^P} - \text{NUMBER OF WRAPS} \right) 2^P$$

In Equation 2, the first term represents the number of times that a P-bit counter will roll over in generating an RTS value, plus a decimal residue. This term is a rational number, i.e., including a value to the right of the decimal. Thus, the difference of the two terms in the parenthesis gives a fractional value that is proportional to the value in the P-bit counter, the residue, when it was latched by the modified service clock. When this value is multiplied by $2^P$, the result is the value of the 4-bit counter if the counter had been set to zero prior to count period. NUMBER OF WRAPS is the number of times that the 4-bit counter wraps for Q periods of the service clock. For T1 service, NUMBER OF WRAPS is 295 and for E1 service NUMBER OF WRAPS is 223.

Equation 2 can be manipulated to derive an equation for the service clock frequency, $f_S$, as a function of interpolated RTS values (RTS'), $f_S = F(RTS')$, as shown in Equation 3.

$$f_S = F(RTS') = \frac{\frac{f_{NET} \cdot Q}{2^P}}{\frac{RTS'}{2^P} + \text{NUMBER OF WRAPS}}$$

Using Equation 3, destination node 100 can recover the service clock frequency of source node 104 using only the RTS values.

As described above, a direct digital synthesis circuit produces a signal with a frequency that is a fraction of a reference clock. This is represented in equation 4:

$$F = \frac{x}{2^n} \cdot f_{REF}$$

In equation 4, the value X represents the value that is written to the direct digital synthesis circuit to set the frequency of its output. The number n is the number of bits in the value to be written and $f_{REF}$ is the frequency of the reference clock. Equation 4 can be solved for X in terms of the frequency of the service clock as shown in Equation 5:

$$X = \frac{2^n}{f_{REF}} F(RTS')$$

In this equation, the desired frequency (f) has been replaced with the expression F(RTS'). Thus, Equation 5 provides a relationship between the number to be written to the register of direct digital synthesis circuit 120 that is based entirely on the RTS values.

Advantageously, microcontroller 116 processes RTS values over a plurality of time windows before adjusting the setting of direct digital synthesis circuit 120. For example, in one embodiment, microcontroller 116 processes RTS samples over four time windows, namely, time windows of 2, 20, 200 and 2000 seconds. For each time window, microcontroller 116 considers samples of RTS values to determine a value X to be written to the register of direct digital synthesis circuit 120. In determining this value, microcontroller 116 uses Equation 6 to determine an interpolated value of RTS, RTS', to be used in calculating the value of X with Equation 5 for each time window.

$$RTS' = \frac{Nx + My}{x + y}$$

Equation 6 represents a calculation of the mean RTS value when there are x RTS values of N (majority count) and y RTS values of M (minority count), with x greater than y. By processing a large number of samples, direct digital synthesis circuit 120 can be controlled to produce a reference clock with an accuracy of approximately 0.1 PPM, assuming that the network clock frequencies are the same at source node 104 and destination node 100.

In one embodiment, counting circuit 112 maintains three counters to provide microcontroller 116 with the RTS samples necessary to control DDS circuit 120. Each counter of counting circuit 120 corresponds to one of three expected RTS values (namely, 13, 14, and 15). The RTS values used by counting circuit 112 are calculated by using the two's complement of the difference between two consecutive RTS values. Microcontroller 116 reads the counters of counting circuit 112 every 2 seconds. Microcontroller 116 uses the read values to update the majority and minority counts for the current 2, 20, 200, and 2000 second windows for use in calculating the value to control DDS circuit 120. The flow chart of FIG. 2, described below, provides one process for using the majority and minority counts from the four time windows to generate an input to control DDS circuit 120.

Microcontroller 116 can implement Equation 5 without the need to use floating point calculations. For example, Equation 5 can be modified as follows for delivering T1 service with a reference clock that is 19.44 MHz:

$$X = \frac{48,128\_8,192\_4,096}{RTS' + 4,720}$$

By limiting the equation to integer values, floating point calculation can be avoided. In other embodiments, floating point calculations can be used when an appropriate processor is available.

Figure 2:
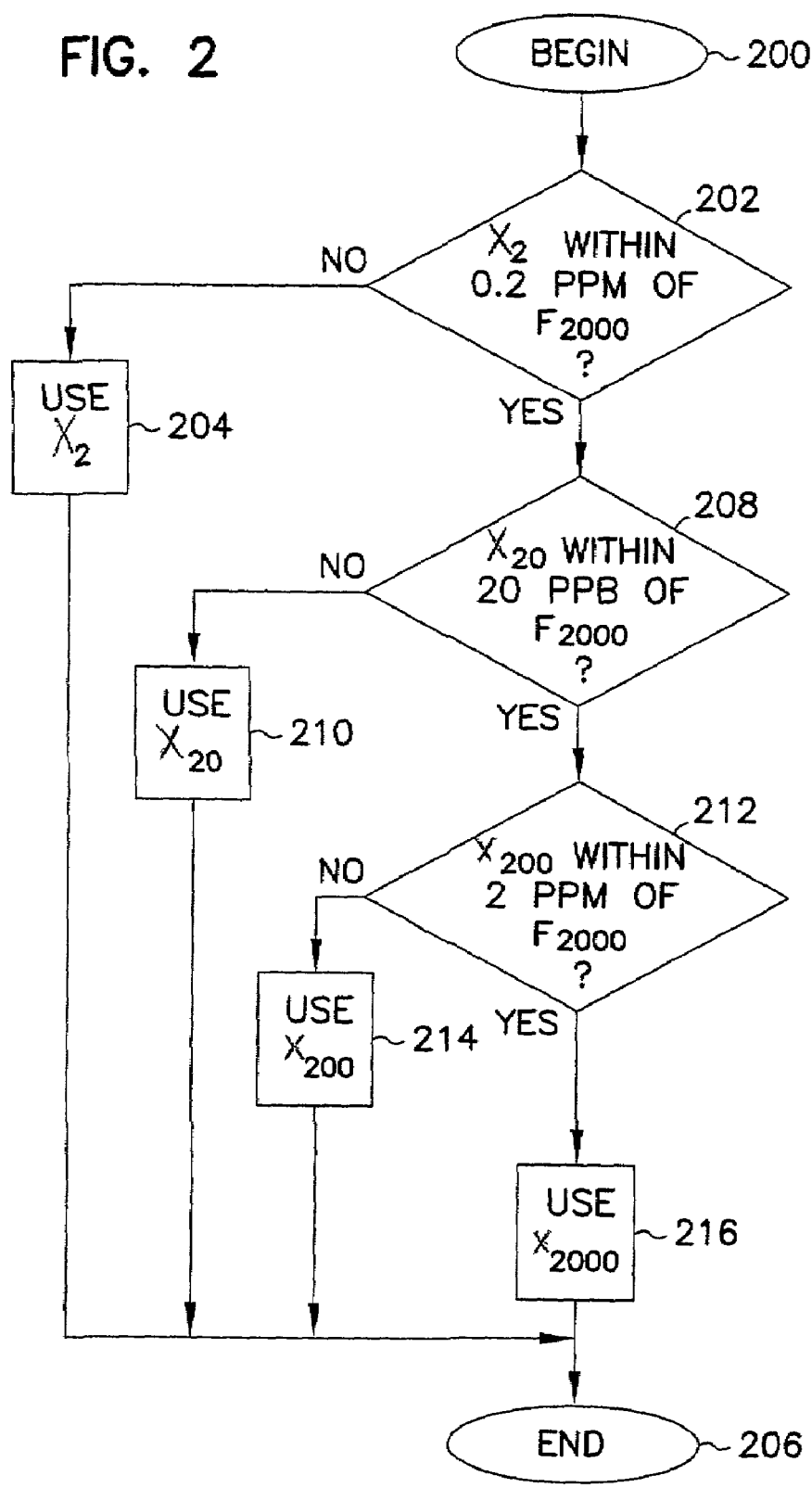
FIG. 2 is a flow chart of an embodiment of a process for setting a frequency of a local service clock according to the teachings of the present invention.

FIG. 2 is a flow chart of an embodiment of a process for setting a frequency of a local service clock according to the teachings of the present invention. The method of FIG. 2 begins at block 200. This embodiment makes adjustments to a direct digital synthesis circuit based on monitored RTS values over four time windows although, in other embodiments, the number of time windows used may vary. The process calculates control values, labeled $X_N$ with the subscript N corresponding to the number of seconds in a time window, for the direct digital synthesis circuit based on the RTS sample for each time window. Then, based on specified comparisons, the process selects one of the control values.

At block 202, the method determines whether the value $X_2$ for the two second window is within 0.2 parts per million (PPM) of the value $X_{2000}$. If not, then there has been sufficient change in the short term to adjust the direct digital synthesis circuit based on the value $X_2$ at block 204. If, however, the value for $X_2$ is within the specified limit of the value for $X_{2000}$, then the method proceeds to block 208.

At block 208, the method determines whether the value $X_{20}$ for the twenty second window is within 20 parts per billion (PPB) of the value $X_{2000}$. If not, then there has been sufficient change to adjust the direct digital synthesis circuit based on the value $X_{20}$ at block 210. If, however, the value for $X_{20}$ is within the specified limit of the value for $X_{2000}$, then the method proceeds to block 212.

At block 212, the method determines whether the value $X_{200}$ for the two hundred second window is within 2 parts per billion (PPB) of the value $X_{2000}$. If not, then there has been sufficient change to adjust the direct digital synthesis circuit based on the value $X_{200}$ at block 214. If, however, the value for $X_{200}$ is within the specified limit of the value for $X_{2000}$, then the method proceeds to block 216 and uses the value for $X_{2000}$.

The method ends at block 206.

As mentioned above, microcontroller 116 uses the average buffer fill level data to calculate a more optimum setting of direct digital synthesis circuit 120. It is noted that microcontroller 116 in another embodiment uses peak buffer fill level information as described below with respect to FIG. 3. The peak buffer fill level information can be used alone or in combination with RTS values. Microcontroller 116 analyzes the buffer fill levels to evaluate three related aspects of the operation of destination node 100. First, microcontroller 116 uses the buffer fill level data to monitor the quality of the RTS' service clock recovery for a particular port described above. Further, microcontroller 116 uses the buffer fill level data across all ports to analyze for possible differences in the network clock at the source and destination nodes. Finally, microcontroller 116 uses the buffer fill level data to calculate Cell Delay Variation at a particular port of the destination node to determine an optimum level for that port. Each of these functions of microcontroller 116 are discussed, in turn, below.

Microcontroller 116 analyzes the buffer fill levels for each port of a destination node to assist in synchronizing the service clock at destination node 100 with the service clock at the source node for the port. In one embodiment, microcontroller 116 receives an update on the fill level of buffer 114 with the arrival of each new cell. If the service clock for a port of destination node 100 is substantially synchronized with the service clock of source node 104, then the average fill level of buffer 114 should remain approximately constant over time since data packets are being generated at source node 104 and processed at destination node 100 at approximately the same speed. However, as mentioned, network 102 can introduce a variable delay for each packet it transports between source node 102 and destination node 100. This delay is typically referred to as "cell jitter" or "cell delay variation." To account for this cell delay variation, microcontroller 116 looks at the buffer fill level for a period of time before making an adjustment, if any, to the setting of direct digital synthesis circuit 120. For example, microcontroller 116 can average the buffer fill level data over a period of 10 seconds for T1 service.

With T1 service, if the service clock at the destination node is in error by −1 PPM, then the average buffer fill level for a port will increase by 1 byte in approximately 5.18 seconds. With this information, microcontroller 116 can determine an appropriate offset for direct digital synthesis circuit 120 so as to synchronize the local service clock with the service clock at source node 104. If the buffer fill level is increasing, then the service clock speed is increased so that packets are processed faster. If, however, the buffer fill level is decreasing then the service clock speed is decreased so that packets are processed slower.

Microcontroller 116 also analyzes the buffer fill level data over all ports on destination node 100 to detect an error in network clocks between source and destination nodes. When a significant correlation in drift of the buffer fill levels of all ports is detected, a correction can be added to the setting of direct digital synthesis circuit 120 to compensate for the difference in network clock frequencies. Such differences may be due, for example, to not having a common network reference clock at the source and destination nodes. Microcontroller 116 can use this correction factor for each port of destination node 100.

Finally, microcontroller 116 also analyzes the buffer fill level data to determine an optimal operating point for a buffer for a particular port. Microcontroller 116 uses the information provided by buffer 114 to determine cell-to-cell delay variation. Further, microcontroller 116 uses the extremes of cell delay variation to determine peak-to-peak cell delay variation. With this information, microcontroller 116 can set the frequency of direct digital synthesis circuit 120 to achieve an average buffer fill level that accommodates the expected peak-to-peak cell delay variation, without adding excess cell delay.

Advantageously, by averaging the buffer fill level data for 10 seconds before adjusting the direct digital synthesis circuit in each of the above operations, the maximum wander component frequency that can be found on the output of the local service clock is 0.05 Hz.

III. Adaptive Clock Recovery

Figure 3:
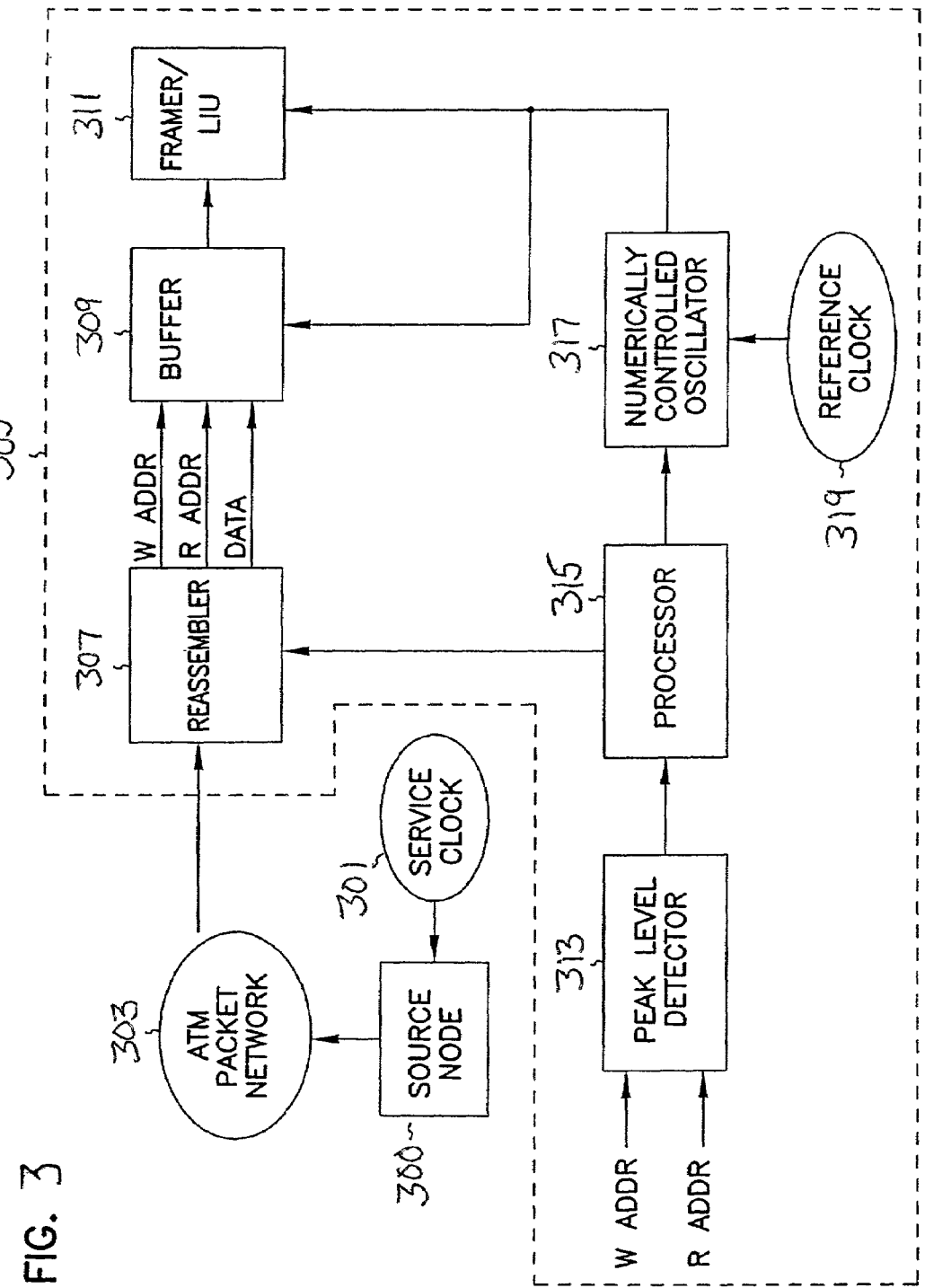
FIG. 3 is a block diagram of an embodiment of a packet network that uses adaptive clock recovery at a destination node according to the teachings of the present invention.

FIG. 3 is a block diagram of an illustrative embodiment of the present invention. A source node 300 sends data packets through an ATM network 303 to a destination node 305. A service clock 301 regulates the rate at which the source node 300 transmits data to the destination node 305.

Destination node 305 receives and processes data packets from source node 300. Advantageously, destination node 305 uses an adaptive clock recovery scheme that monitors a peak buffer fill level to lock a local oscillator of destination node 305 with the frequency of service clock 301 in a manner that meets system wander limits.

Destination node 305 includes reassembler 307. Reassembler 307 receives the data packets from the source node 300 and places the data packets in proper sequence. Reassembler 307 is coupled to buffer 309. Buffer 309 is coupled to framer/Line Interface Unit (L.I.U.) 311. Buffer 309 receives the data packets from the reassembler 307 then passes the data packets, sequentially to the framer/L.I.U. 311. Framer/L.I.U. 311 receives the data packets from the buffer 309 and passes the data from the data packets according to the original format. Any data format can be used by the framer/L.I.U. 311. In one embodiment, the data is formatted for transmission on a T1 line.

The reading and writing of data to and from buffer 309 is controlled by addresses label W ADDR ("write address") and R ADDR ("read address"). The write address identifies where the most recent data was written to buffer 309 from reassembler 307. The read address identifies where the most recent data was read from buffer 309 by framer/L.I.U. 311. Thus, the difference between these two addresses is indicative of a fill level of the buffer.

As data is processed by destination node 305, read and write addresses are compared by peak fill level detector 313 and the difference is stored in a register. The peak fill level detector 313 may be implemented in a Field Programmable Gate Array ("FPGA") or may be performed by the microprocessor, if every buffer fill sample is made available. Peak fill level detector 313 continues to compare read and write addresses for a period of time, e.g., one to two seconds, to check if the new buffer fill level based on the difference between the read address and write address is greater than the current value in the register. If so, the peak fill level detector 313 replaces the value in the register with the current buffer fill level. Ultimately, at the end of the period of time, the register contains a peak fill level for the buffer 309.

At the end of the period of time, a processor 315 reads the register in the peak fill level detector 313 to get the peak fill number. Processor 315 clears the register to zero. Peak fill level detector 313 then repeats the process to obtain further peak fill numbers for further time periods.

Processor 315 uses the peak fill number from the register and a clock control algorithm to adjust, as necessary, the input to a numerically controlled oscillator 317. The output of the numerically controlled oscillator 317 is the local clock of destination node 305 and, by means of an adaptive algorithm, is locked to service clock 301. This process excludes data for loop control that has been corrupted by Cell Transfer Delay Variation.

Numerically controlled oscillator 317 establishes an output frequency based on a number provided by processor 315 and the frequency of reference clock 319. In one embodiment, numerically controlled oscillator 317 comprises a Direct Digital Synthesis ("DDS") integrated circuit available from Analog Devices. Further, reference clock 319 is a clock with an accuracy of a stratum 1, 2, or 3E clock. The frequency of reference clock 319, is thus, assumed to be fixed at a selected level, e.g., 19.44 MHz. Thus, to control the frequency of the signal output by numerically controlled oscillator 317, it is only necessary to determine the appropriate numeric value to provide to numerically controlled oscillator 317. This process results in a recovered clock that contains no jitter.

Source node 300 can transmit signals to destination node 305 in a number of different standard formats. For example, these formats include, but are not limited to, DS1, E1, E3, and DS3. Each of these formats has a nominal frequency associated with it. A number for numerically controlled oscillator 317 that will achieve a target frequency is calculated according to equation 1:

$$\text{Number} = \frac{\text{Target Frequency} \times 2^{32}}{\text{Reference Frequency}}$$

In Equation 1, the Target Frequency is the nominal frequency for the selected service, e.g., 1.544 MHz for DS1, 2.048 MHz for E1, 17.184 MHz for E3 and 22.368 MHz for DS3 service. The reference frequency is the frequency of reference clock 319. The number, $2^{32}$, represents the highest value of the 32 bit number that can be applied to numerically controlled oscillator 317. Essentially, the number applied to numerically controlled oscillator 317 sets a ratio between the frequency of the output and the reference clock 319. In the case of DS1 and E1, a 19.44 MHz reference clock can be used. Similarly, a 77.76 MHz reference frequency clock can be used for E3 and DS3 service, but a 2× clock multiplier follows the numerically controlled oscillator output to achieve the required 34.368 MHz for E3, and 44.736 MHz for DS3. Newer DDS circuits can produce the required output frequency directly. With these values, the number that achieves these nominal frequencies for the identified services are as follows:

| Service | Number |
|---------|--------|
| DS1 | 341,122,916.925 |
| E1 | 452,473,920.896 |
| E3 | 949,134,748.129 |
| DS3 | 1,234,465,901.19 |

Since only integer numbers can be provided, the next highest and next lowest integer values are used. The frequencies that result from these values can be calculated according to Equation 2:

$$Frequency = \frac{Number \times Reference\ Frequency}{2^{32}}$$

This results in the following frequencies for each service:

| Service | Frequency (High) | Frequency (Low) | Difference |
|---------|------------------|-----------------|------------|
| DS1 | 1,544,000.00034 Hz | 1,543,999.99581 Hz | 0.00453 Hz |
| E1 | 2,048,000.00047 Hz | 2,047,999.9959 Hz | 0.00457 Hz |
| E3 | 17,184,000.0158 Hz | 17,183,999.9977 Hz | 0.0181 Hz * |
| DS3 | 22,368,000.0146 Hz | 22,367,999.9965 Hz | 0.0181 Hz * |

From the difference values, the effect of a one bit change in the value of the number can be calculated for each service:
For each service, the effect, in nanoseconds-per-second is as follows:

| Service | Effect |
|---------|--------|
| DS1 | 2.9339 |
| E1 | 2.231 |
| E3 | 1.053 * |
| DS3 | 0.8092* |

* The difference frequency in equation (3) must be 2 times the table value, because the DDS output frequencies are doubled to achieve the required frequencies.

Essentially, processor 315 can calculate the rate of change of the buffer fill level in terms of a nanosecond-per-second value. Based on this value, processor 315 can determine an amount by which to adjust the number provided to numerically controlled oscillator 317 to compensate for the change in the buffers fill level using the above numbers for the selected service.

Processor 315 uses a clock control algorithm to acquire frequency and phase lock and to track phase of the service clock 301 by the destination node 305. The clock control algorithm has three different functions: 1. frequency acquisition, 2. phase acquisition, and 3. phase track.

Before transmission of a signal by source node 300, the buffer fill level at the destination node 305 reduces to zero, because the data is clocked out of the buffer by the numerically controlled oscillator 317, but no valid data is being written into the buffer from the source node 300. The numerically controlled oscillator 317 is then set to a frequency equal to the lowest frequency allowed by specification for service clock 301. When data is received at the buffer 309, the buffer fill level changes. This change is calculated as a nanosecond per second change. Based on this value, a change in the number to the numerically controlled oscillator 317 can be calculated and written to reduce the frequency offset to zero.

Phase uncertainty is introduced at destination node 305 since buffer 309 is configured byte-wide. This introduces an 8-unit interval (UI) uncertainty in the buffer fill level. By the time frequency lock is achieved, there is typically a higher fill level than target fill level because the numerically controlled oscillator 317 was set to read data from the buffer 309 at a slower rate than data written to the buffer 309, in order to accumulate data to calculate frequency offset. After frequency acquisition, buffer 309 fill level is reduced to target level at a controlled rate to avoid data loss. This is achieved by increasing the frequency of the numerically controlled oscillator 317 to a slightly higher value than the frequency of service clock 301. Once the buffer fill level is reduced to the selected target level, the frequency of the numerically controlled oscillator 317 is lowered slightly below the frequency lock value in order to transition between a target byte and a next higher byte. When this boundary is located, the number of the numerically controlled oscillator 317 will be changed to the zero frequency offset number. At this point, a phase detector with bit level resolution is realized.

The last function of the clock algorithm is the phase track where a number from the numerically controlled oscillator 317 is adjusted by one digit or more digits as required to maintain phase alignment at the byte boundary described.

In one embodiment, the clock recovery mechanism of FIG. 3 is also implemented over a plurality of time periods as described above with respect to FIG. 2. In this embodiment, the method of FIG. 2 begins at block 200. This embodiment makes adjustments to a direct digital synthesis circuit based on peak buffer fill levels over four time windows although, in other embodiments, the number of time windows used may vary. The process calculates control values, labeled $X_N$, with the subscript N corresponding to the number of seconds in a time window, for the direct digital synthesis circuit based on the peak fill levels for each time window. Then, based on specified comparisons, the process selects one of the control values.

At block 202, the method determines whether the value $X_2$ for the two second window is within 0.2 parts per million (PPM) of the value $X_{2000}$. If not, then there has been sufficient change in the short term to adjust the direct digital synthesis circuit based on the value $X_2$ at block 204. If, however, the value for $X_2$ is within the specified limit of the value for $X_{2000}$, then the method proceeds to block 208.

At block 208, the method determines whether the value $X_{20}$ for the twenty second window is within 20 parts per billion (PPB) of the value $X_{2000}$. If not, then there has been sufficient change to adjust the direct digital synthesis circuit based on the value $X_{20}$ at block 210. If, however, the value for $X_{20}$ is within the specified limit of the value for $X_{2000}$, then the method proceeds to block 212.

At block 212, the method determines whether the value $X_{200}$ for the two hundred second window is within 2 parts per billion (PPB) of the value $X_{2000}$. If not, then there has been sufficient change to adjust the direct digital synthesis circuit based on the value $X_{200}$ at block 214. f, however, the value for $X_{200}$ is within the specified limit of the value for $X_{2000}$, then the method proceeds to block 216 and uses the value for $X_{2000}$.

The method ends at block 206.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the service clock recovery technique can be used for other services, e.g., E1 and other conventional continuous bit rate services, and this application is not limited to use with T1 service. In other embodiments, RTS values are used in conjunction with peak buffer fill levels. In other embodiments, the number of time periods used to monitor the control signals for the recovered clock varies from the 2, 20, 200, and 2000 second time periods described here. Further, in other embodiments, the microcontroller uses other appropriate comparisons, e.g., different acceptable ranges, among the calculations for the various time windows to select the control signal used to control the local clock.

What is claimed is:

1. A method for synchronizing a service clock at a destination node with a service clock at a source node for circuit emulation service over a packet network, the method comprising:
   receiving data packets from a source node at at least one port of the destination node;
   at the destination node, removing from the data packets residual time stamp (RTS) values that were created at the source node based on at least the service clock at the source node;
   determining a majority count and a minority count, based on the RTS values, for each of a plurality of time periods; and
   using the majority and minority counts for the plurality of time periods to calculate a control value to set the frequency of a service clock at the destination node for use in receiving data packets.

2. The method of claim 1, wherein determining a majority count and a minority count comprises counting values based on the two's complement of a difference between consecutive RTS values.

3. The method of claim 1, wherein determining a majority count and a minority count includes counting the occurrence of three expected values.

4. The method of claim 1, wherein determining a majority count and a minority count comprises determining a majority count and a minority count over four time periods.

5. The method of claim 4, wherein determining a majority count arid a minority count over four time periods comprises determining a majority count arid a minority count over 2, 20, 200 and 2000 second time periods.

6. The method of claim 1, wherein determining a majority count and a minority count over a plurality of time periods includes reading a plurality of counters every 2 seconds.

7. The method of claim 1, wherein using the majority and minority counts for the plurality of time periods to calculate a control value comprises:
   comparing calculations for the control value based on the majority and minority counts for the plurality of time periods; and
   selecting one of the calculated control values generated from the majority and minority counts from one of the time periods.

8. The method of claim 7, wherein comparing calculations for the control value based on the majority and minority counts for the plurality of time periods comprises sequentially comparing calculations for the control value for a longest of the plurality of time periods with the control values for the other of the plurality of time periods.

9. The method of claim 8, wherein selecting one of the calculated control values comprises selecting the control value for the longest of the plurality of time periods unless one of the control values of the other of the plurality of time periods is not within selected bounds of the control value of the longest of the plurality of time periods.

10. The method of claim 1, and further monitoring the fill level of a buffer associated with the at least one port of the destination node to determine whether to adjust the frequency of the service clock.

11. The method of claim 10, wherein:
   when the average fill level decreases over time, decreasing the frequency of the service clock at the destination node; and
   when the average fill level increases over time, increasing the frequency of the service clock at the destination node.

12. The method of claim 10, wherein monitoring the fill level of the buffer comprises averaging the buffer fill level of each of the ports of the destination node for at least 10 seconds.

13. The method of claim 1, using the majority and minority counts for the plurality of time periods to calculate a control value to set the frequency of a service clock at the destination node for use in receiving data packets comprises calculating an n-bit number, X, for a direct digital synthesis circuit using the following equation:

$$X = \frac{2^n}{f_{REF}} F(RTS')$$

wherein F(RTS') is a function that relates the frequency at the source node to the stored RTS values over a period of time.

14. A method for synchronizing a service clock at a destination node in a packet switch network wherein packets are transmitted from a source node to a destination node and wherein the source node calculates and transmits residual time stamp (RTS) values in the data packets, the method comprising:
   removing RTS values from data packets at the destination node; and
   using RTS values over a plurality of time periods to set a direct digital synthesis circuit to act as the service clock for the destination node with a frequency that is substantially synchronized with a service clock at the source node.

15. The method of claim 14, wherein using RTS values over a plurality of time periods to set a direct digital synthesis circuit comprises determining a majority count and a minority count, based on the RTS values, over each of a plurality of time periods and using the majority and minority counts for the plurality of time periods to calculate a control value for the direct digital synthesis circuit.

16. The method of claim 15, wherein using the majority and minority counts for the plurality of time periods to calculate a control value comprises:
comparing calculations for the control value based on the majority and minority counts for the plurality of time periods; and
selecting one of the calculated control values generated from the majority and minority counts from one of the time periods.

17. The method of claim 16, wherein comparing calculations for the control value based on the majority and minority counts for the plurality of time periods comprises comparing calculations for the control value for a longest of the plurality of time periods with the control values for the other of the plurality of time periods.

18. The method of claim 17, wherein selecting one of the calculated control values comprises selecting the control value for the longest of the plurality of time periods unless one of the control values of the other of the plurality of time periods is not within selected bounds of the control value of the longest of the plurality of time periods.

19. The method of claim 14, wherein using the RTS values to set the direct digital synthesis circuit comprises generating an n-bit number and providing the n-bit number to the direct digital synthesis circuit.

20. The method of claim 19, wherein the destination node calculates the value of the n-bit number using non-floating point calculations.

21. The method of claim 14, and further monitoring the fill level of a buffer associated with the at least one port of the destination node to determine whether to adjust the frequency of the service clock.

22. The method of claim 21, wherein:
when the average fill level decreases over time, decreasing the frequency of the service clock at the destination node; and
when the average fill level increases over time, increasing the frequency of the service clock at the destination node.

23. The method of claim 21, wherein monitoring the fill level of the buffer comprises averaging the buffer fill level of each of the ports of the destination node for at least 10 seconds.

24. A system for recovering a service clock at a network node for circuit emulation service over a packet network, the system comprising:
a direct digital synthesis circuit for each port that generates a local service clock signal for each port of the network node;
a circuit, coupled to a port of the network node, that removes residual time stamp (RTS) values from data packets that are received at the port of the network node;
a counting circuit that determines majority and minority counts based on the RTS values over a plurality of time periods: and
a microcontroller that uses the majority and minority counts over the plurality of time periods to generate a number to set the frequency of the direct digital synthesis circuit.

25. The system of claim 24, and further comprising a buffer associated with each port, wherein the microcontroller further monitors the fill level of the buffer to determine whether to adjust the frequency of the direct digital synthesis circuit for each port.

26. The system of claim 24, wherein the microcontroller compares calculations for the number for the direct digital synthesis circuit based on the majority and minority counts for the plurality of time periods and selects one of the calculated numbers generated from the majority and minority counts from one of the time periods.

27. The system of claim 24, wherein the microcontroller reads values from the counting circuit every two seconds.

28. The system of claim 24, wherein the microcontroller trucks majority and minority counts for four time periods.

29. The system of claim 28, wherein the four time periods comprise 2, 20, 200, and 2000 seconds.

30. The system of claim 24, wherein the counting circuit includes counters for each of three expected RTS values.

31. The system of claim 24, wherein the circuit that removes the residual time stamp values provides the two's complement of the difference between successive RTS values to the counting circuit.

32. A method for service clock recovery, the method comprising:
removing residual time stamp (RTS) values from data packets at the destination node;
using the removed RTS value over a plurality of time periods to set the service clock for the destination node; and
wherein using the removed RTS values comprises using majority and minority counts based on RTS values over at least two time periods.

33. A method for service clock recovery, the method comprising:
removing residual time stamp (RTS) values from data packets at the destination node;
using the removed RTS values over a plurality of time periods to set the service clock for the destination node; and
wherein using the removed RTS values comprises calculating a plurality of control signal based on RTS values received over a plurality of time periods and selecting one of the control signals to control the local service clock.

34. A network node coupleable to a packet network, the network node comprising:
a packet disassembler having an input coupleable to the packet network;
an overhead processor, coupled to the packet disassembler, that removes data and residual time stamp (RTS) values from data packets received at the input;
a counting circuit, coupled to the overhead processor, that determines majority and minority counts based on the RTS values over a plurality of time periods;
a data buffer, coupled to the overhead processor, that receives the data from the packets;
a line interface unit, coupled to the data buffer;
a direct digital synthesis circuit, coupled to the data buffer and the line interface unit, that generates a local service clock signal; and
a microcontroller, responsive to the counting circuit, wherein the microcontroller uses the majority and minority counts from the counting circuit over the plurality of time periods to generate a number to set the frequency of the direct digital synthesis circuit.

35. The network node of claim 34, wherein the microcontroller is further responsive to a fill level of the data buffer to adjust the control signal provided to the direct digital synthesis circuit.

36. The network node of claim 34, wherein the microcontroller reads the majority and minority counts overtime periods of 2, 20, 200, and 2000 seconds to generate the control signal for the direct digital synthesis circuit.

37. The network node of claim 34, wherein the microcontroller reads majority and minority counts from the counting circuit every 2 seconds.

38. The network node of claim 34, wherein the microcontroller calculates control signals based on majority and minority counts for each of the plurality of time periods and selects one of the control signals to provide to the direct digital synthesis circuit.

39. A network node coupleable to a packet network, the network node comprising:
   a packet disassembler having an input coupleable to the packet network;
   an overhead processor, coupled to the packet disassembler, that removes data and residual time stamp (RTS) values from data packets received at the input;
   a counting circuit, coupled to the overhead processor, that produces at least two counts based on the RTS values for a plurality of time periods;
   a data buffer, coupled to the overhead processor, that receives the data from the packets;
   a line interface unit, coupled to the data buffer;
   a direct digital synthesis circuit, coupled to the data buffer and the line interface unit, that generates a local service clock signal; and
   a microcontroller, responsive to the counting circuit, wherein the microcontroller uses the at least two counts from the counting circuit for the plurality of time periods to generate at least two control values to set the frequency of the direct digital synthesis circuit, selects one of the at least two control values, and provides the selected control value to the direct digital synthesis circuit.

40. A method for clock recovery in a packet network, the method comprising:
   receiving data packets at a destination node;
   storing data from the data packets in a buffer;
   reading the data packets out of the buffer using a locally generated clock;
   monitoring a fill level of the buffer over a plurality of time periods;
   identifying a relative maximum fill level for the buffer during each time period; and
   selectively using the relative maximum fill levels for the plurality of time periods to control a frequency of the locally generated clock so as to control the rate at which data is read out of the buffer.

41. The method of claim 40, wherein selectively using the relative maximum fill level comprises selecting a control signal based on the maximum buffer fill level of one of the plurality of time periods.

42. The method of claim 40, wherein selectively using the relative maximum fill level comprises:
   comparing calculations for the control value based on the relative maximum buffer fill level for the plurality of time periods; and
   selecting one of the calculated control values generated from the relative maximum buffer fill level from one of the time periods.

43. The method of claim 42, wherein comparing calculations for the control value based on the relative maximum buffer fill level for the plurality of time periods comprises comparing calculations for the control value for a longest of the plurality of time periods with the control values for the other of the plurality of time periods.

44. The method of claim 42, wherein selecting one of the calculated control values comprises selecting the control value for the longest of the plurality of time periods unless one of the control values of the other of the plurality of time periods is not within selected bounds of the control value of the longest of the plurality of time periods.

45. The method of claim 43, wherein monitoring a fill level of the buffer comprises monitoring a difference between a read address and a write address of the buffer.

46. A node in a telecommunications network, comprising;
   a buffer having an input that is adapted to receive data packets from another node;
   a peak fill level detector, responsive to address signals for the buffer, wherein the peak fill level detector includes a register that stores relative peak fill levels acquired during a plurality of time periods;
   a variable oscillator coupled to the buffer that controls the rate at which data is processed in the node; and
   a processor coupled to the peak fill level detector, wherein the processor receives the relative peak fill levels from the register and uses the relative peak fill levels for the plurality of time periods to generate a control value that selectively adjusts the variable oscillator.

47. The node of claim 46, wherein the peak fill level detector includes a register that is continuously updated over a period of time with a relative maximum buffer fill level.

48. The node of claim 46, wherein the peak fill detector comprises a mechanism that compares a read address and a write address for the buffer and stores the maximum buffer fill level observed over a period of time.

49. The node of claim 46, wherein the variable oscillator comprises a numerically controlled oscillator.

50. The node of claim 46, wherein the processor is programmed to implement a method for selectively using the relative peak fill levels, the method comprising:
   comparing calculations for the control value based on the relative peak fill level for the plurality of time periods; and
   selecting one of the calculated control values generated from the relative peak fill level from one of the time periods.

51. The node of claim 50, wherein comparing calculations for the control value based on the relative peak fill level for the plurality of time periods comprises comparing calculations for the control value for a longest of the plurality of time periods with the control values for the other of the plurality of time periods.

52. The node of claim 51, wherein selecting one of the calculated control values comprises selecting die control value for the longest of the plurality of time periods unless one of the control values of the other of the plurality or time periods is not within selected bounds of the control value of the longest of the plurality of time periods.

53. A method for adaptive clock recovery, the method comprising:
   monitoring a buffer fill level for a plurality of time periods;
   identifying a relative maximum fill level during the plurality of time periods;
   controlling the frequency of a recovered clock signal based on the relative maximum fill levels for the plurality of time periods such that the recovered clock signal is substantially free of jitter; and wherein controlling the frequency of the recovered clock signal comprises:

determining a rate of change in the relative maximum fill level for each time period; and calculating a numerical value for a numerically controlled oscillator to compensate for the rate of change for a selected time period.

54. A method for adaptive clock recovery, the method comprising:

monitoring a buffer fill level for a plurality of time periods;

identifying a relative maximum fill level during the plurality of time periods;

controlling the frequency of a recovered clock signal based on the relative maximum fill levels for the plurality of time periods such that the recovered clock signal is substantially free of jitter; and wherein controlling the frequency of the recovered clock signal comprises:

comparing calculations far a control value based on the relative maximum fill level for the plurality of time periods; and selecting one of the calculated control values generated from the relative maximum fill level from one of the time periods.

* * * * *

UNITED STATES PATENT AND TRADEMARK OFFICE
CERTIFICATE OF CORRECTION

PATENT NO.         : 7,106,758 B2  
APPLICATION NO. : 09/921945  
DATED                  : September 12, 2006  
INVENTOR(S)        : Belk et al.

Page 1 of 1

It is certified that error appears in the above-identified patent and that said Letters Patent is hereby corrected as shown below:

At Claim 5, Column 13, Line 61, replace the first occurrence of "arid" with --and--; at line 62, replace the first occurrence of "arid" with --and--

At Claim 36, Column 17, Lines 5 to 8, replace the phrase "the microcontroller reads the majority and minority counts overtime periods" with the phrase --the microcontroller uses the majority and minority counts over time periods--

At Claim 52, Column 18, Line 54, replace the first occurrence of "die" with --the--; at line 57, replace the first occurrence of "or" with --of--

Signed and Sealed this

Sixteenth Day of December, 2008

JON W. DUDAS  
*Director of the United States Patent and Trademark Office*